Aug. 4, 1925.

W. F. PFANDER

CUSHION COUPLING

Filed Oct. 1, 1923

Inventor
WALTER F. PFANDER
By his Attorney
Cornelius C. Billings

Aug. 4, 1925. 1,548,629
W. F. PFANDER
CUSHION COUPLING.
Filed Oct. 1, 1923  3 Sheets-Sheet 2

Inventor
WALTER F. PFANDER
By his Attorney

Aug. 4, 1925.

W. F. PFANDER

CUSHION COUPLING

Filed Oct. 1, 1923

Inventor
WALTER F. PFANDER
By his Attorney

Patented Aug. 4, 1925.

1,548,629

UNITED STATES PATENT OFFICE.

WALTER F. PFANDER, OF YONKERS, NEW YORK, ASSIGNOR TO WILLIAM C. DURANT, OF NEW YORK, N. Y.

CUSHION COUPLING.

Application filed October 1, 1923. Serial No. 665,946.

*To all whom it may concern:*

Be it known that I, WALTER F. PFANDER, a citizen of the United States, and a resident of Yonkers, county of Westchester, State of New York, have invented certain new and useful Improvements in Cushion Couplings, of which the following is a specification.

This invention relates to a cushion coupling for the absorption of torsional vibrations and shocks and, more particularly, to a device suitable for absorbing vibrations and shocks between the clutch and the transmission shaft of automobiles.

In starting a motor vehicle or in shifting gears, there is frequently a sudden jerk as the clutch is engaged, particularly if this engagement is done very rapidly in starting the car. This is not only disagreeable to the passengers in the vehicle but also throws stresses on the transmission mechanism and vehicle that have a destructive, wearing action. There are, in addition, numerous smaller torsional vibrations between the crank shaft and the transmission shaft due to changes in the speed and other variations in the action of the engine that have a wearing or injurious action on the vehicle.

An object of the present invention is to provide a resilient coupling device between a driving shaft or rotating element and a driven shaft or element to absorb torsional shocks and vibrations.

Another object of the invention is to provide a means by which the shocks and vibrations transmitted from a clutch of a motor vehicle may be softened or absorbed in their transmission to the transmission shaft.

Further objects of the invention are to provide a cushioning device of this type in which the resiliency of the absorbing element may be controlled or adjusted, and a device that is compact, simple and not liable to get out of order or to break down.

With these and other objects in view, the invention comprises the device described and set forth in the following specification and claims.

The various features of the invention are illustrated in the accompanying drawings in which.

Figure 1:
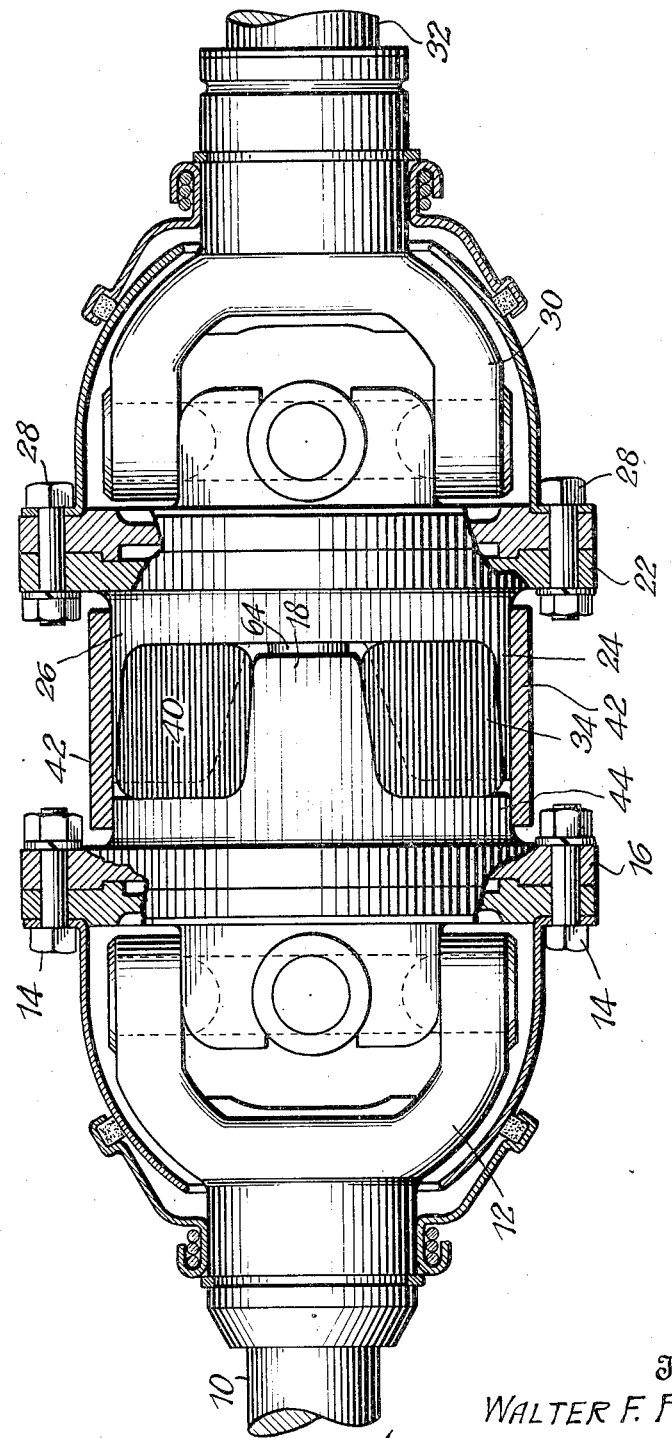
Fig. 1 is a longitudinal sectional view of a coupling embodying a preferred form of the invention.
Figure 3:
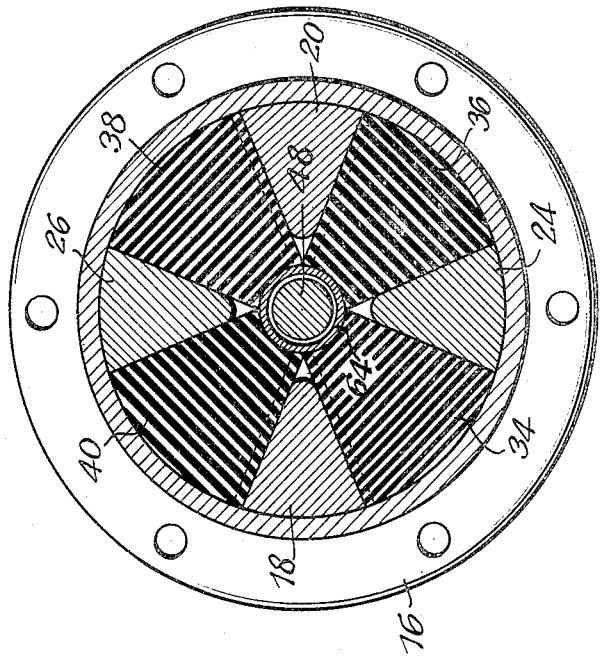
Fig. 3 is a section of the cushioning device on line 3—3 of Fig. 2.
Figure 2:
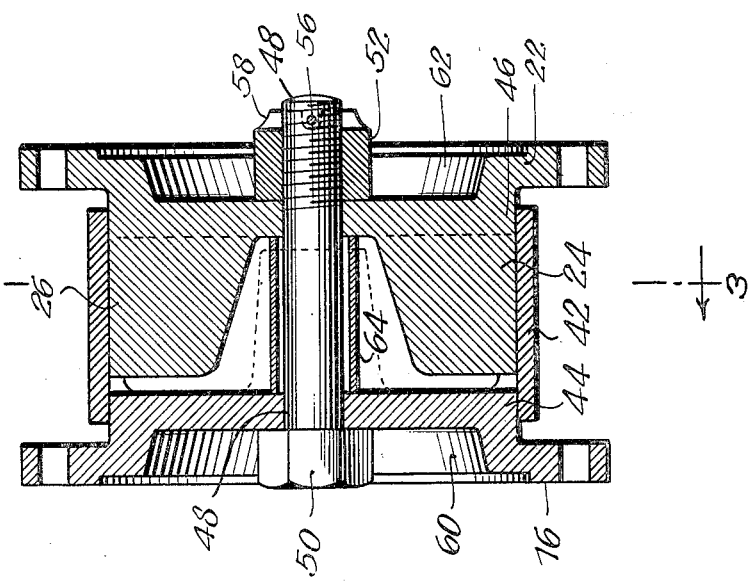
Fig. 2 is an axial section of a cushioning device forming part of the coupling of Fig. 1.

In my present invention, a driving element, which may be driven directly from a clutch crank shaft or other driving element, is provided with wings or lugs positioned to interfere with or engage similar wings or lugs of a driven element, which may directly drive the transmission of a vehicle, and with a resilient element positioned between the wings of the driving and driven elements so that it is placed under a strain as the wings are driven towards an engaging position. The wings or lugs of the driving element are preferably mounted on a plate driven from the crank shaft or clutch of the driving element and project longitudinally and radially of the axis of rotation of the plate. The wings or lugs of the driven element are similarly mounted on a plate, which drives the transmission mechanism, and extend in the opposite direction from the plate to a position to interfere with the wings of the driving plate. Between the radial faces of the driving and driven wings are positioned resilient cushioning pieces of rubber or other material held in position by an enclosing ring. The radial faces of the wings are preferably beveled so that, as their plates are forced together longitudinally, the space between the wings is decreased and the wear of the resilient members may be taken up.

Referring more particularly to the accompanying drawings, the cushion coupling is driven from a driving shaft 10 connected to a clutch or other driving or transmission mechanism through a universal joint 12 attached by means of bolts 14 to a circular plate 16 forming the driving plate of the cushion coupling. A pair of wings 18 and 20 are formed integrally on the unattached face of the plate 16 on diametrically opposite sides of the axis of the plate and extend a short distance in a longitudinal direction from the plate. A driven plate 22 is formed with similar diametrically arranged wings 24 and 26 extending toward the driving plate between, and in interfering relation to, the wings 18 and 20, so that, as the driving plate is rotated about its center or axis, the wings 18 and 20 tend to be brought into contact with the wings 24 and 26 and to thereby drive the plate 22, to which is attached, by means of bolts 28, a universal joint 30 and a driven or transmission shaft 32.

The wings 18, 20, 24 and 26 are formed of a cross section in the shape of a sector of a circle and the size of the sectors is insufficient to completely fill the circle in which they are enclosed, thereby forming sector shaped spaces between the adjacent lugs. In these spaces are inserted sector shaped cushion blocks of rubber 34, 36, 38 and 40 the size of which is such as to fill the spaces when the wings 18 and 20 are spaced equally from the wings 24 and 26. Accordingly, as the plate 16 is rotated in a direction to bring the wings 18 and 20 towards the wings 24 and 26, respectively, the cushion blocks 34 and 38 are compressed and take up the vibration or shock, and, as the plate is rotated in the opposite direction, the blocks 36 and 40 are compressed. The shocks and vibrations are thereby deadened and a sudden change in the rotation of the plate 16 relative to the plate 22 is distributed over a length of time that permits the drvien plate to be more gradually brought to the speed of the driving plate 16. The cushion blocks 34—40 are retained in position by means of a ring or band 42 encircling the wings and rubber pieces and overlapping raised or boss portions 44 and 46 on the opposing faces of the plates 16 and 22.

Figure 5:
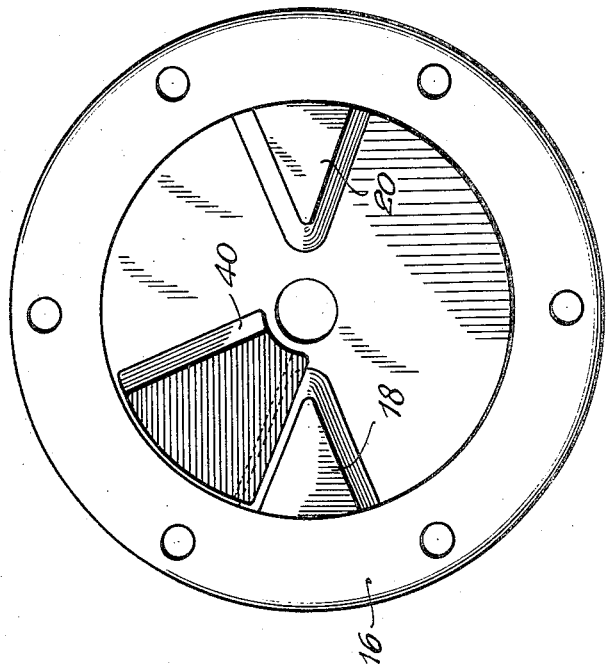
Figure 4:
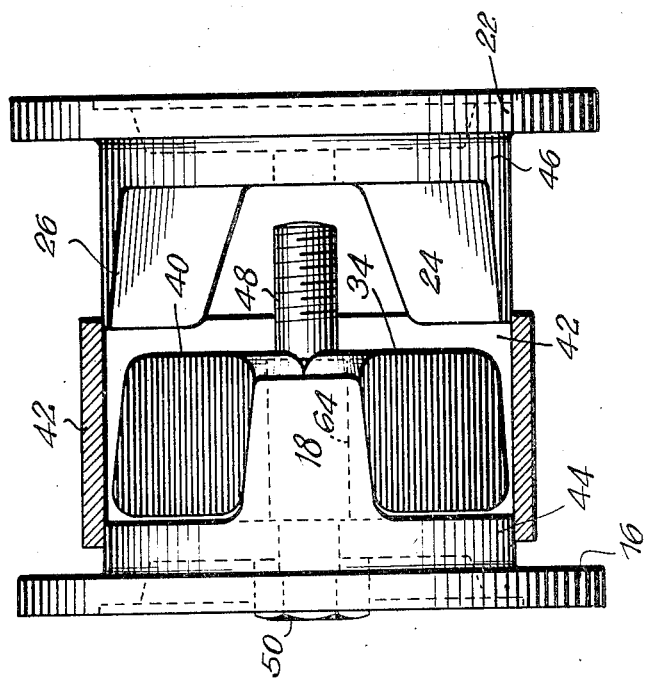
Fig. 4 is a section of the cushioning device taken on a line similar to that of Fig. 2 but showing some of the elements displaced longitudinally to illustrate the manner of assembling the device, and, Fig. 5 is an end view of an element of the cushioning device and a resilient element showing the relation of these elements.

The wings 18—26 are slightly beveled or tapered towards their ends, as indicated in Fig. 5, so that, as the plates 16 and 22 are forced towards each other, the distance between opposing sides of the wings decreases and thus, by forcing the plates towards each other any wear in the cushion blocks may be taken up. The corresponding faces of the cushion blocks are inclined so as to fit against the faces of the wings, the blocks having a skew shape, and the thickness of the blocks between these faces being such when the blocks are new as to hold the wings of one plate from touching the face of the other plate. The plates 16 and 22 are held together and their positions relative to each other adjusted by means of a bolt 48 extending axially through both plates and having a head 50 engaging the outer face of plate 16 and a nut 52 threaded on the bolt and engaging the outer faces of the plate 22. The outer end of the bolt is also pierced by a hole 56 and the nut 52 provided with a series of diametrical notches 58 through which a cotter pin may be inserted to keep the nut from turning on the bolt.

The plates 16 and 22 are also preferably countersunk as 60 and 62 to form spaces for the reception of the head 50 and the nut 52. The bolt 48 is surrounded by a collar 64 to separate it from the rubber spacing cushions.

By means of the above described invention, a positive transmission is provided through the coupling while the vibrations and sudden changes in speed of the driving elements are taken up or absorbed in the cushion blocks and later transmitted to the driven elements over a longer period of time in which the driven elements are enabled to gradually take up the speed of the driving element.

As changes of construction could be made within the scope of my invention, it is intended that all matter contained in the above description or shown in the accompanying drawings shall be interpreted as illustrative and not in a limiting sense.

Having described the invention, what I claim and desire to secure by Letters Patent is:

1. A device of the type described which comprises, a driving element having wings projecting therefrom, a driven element having wings in interfering position with the wings of the driving element, resilient members between said wings, a universal joint mounted on said driven element and a universal joint mounted on said driving element, said driving and driven elements remaining in fixed spacial positions relative to each other.

2. A device of the type described which comprises, a driving element having wings projecting therefrom in an axial direction, a driven element having wings projecting into an interfering position relative to said driving wings, resilient cushions between said wings, a driving shaft, and a universal joint between said driving shaft and said driving element.

3. A device of the type described which comprises, a pair of plates having wings extending in opposite directions into interfering position relative to each other, resilient cushion blocks between said wings, a bolt holding said plates in fixed, substantially parallel-position and a universal joint between the plates and the driving or driven members to which they are attached.

4. A device of the type described which comprises, a pair of plates having wings extending into interfering position relative to each other and having opposing faces sloping in the same direction, resilient cushions between the faces of said wings and means for drawing said plates and wings together.

5. A device of the type described which comprises, a pair of plates having wings extending into interfering position relative to each other and tapering towards their free ends, resilient cushions filling the spaces between said wings a ring surrounding said wings and cushions and means for adjusting the distance between said plates to decrease or increase the distance between the opposing tapering sides of the wings, said plates being held in fixed, rigid axial relation to each other when adjusted.

6. A device of the type described which comprises, a pair of plates having wings extending into interfering relation to each other said wings being tapered towards their free ends, a bolt holding said plates in position relative to each other, a ring surrounding said wings and resilient cushions filling the spaces between said wings.

7. A device of the type described which comprises, a ring, a pair of plates on opposite sides of said ring and having bosses projecting into said ring and having tapered wings within said ring in interfering relation to the wings of the opposite plate, a central bolt for holding said plates a controllable distance from each other, and resilient cushions filling the spaces between said wings.

WALTER F. PFANDER.